US011483754B2

(12) United States Patent
Lai et al.

(10) Patent No.: US 11,483,754 B2
(45) Date of Patent: Oct. 25, 2022

(54) HANDOVER HANDLING FOR MULTI-ACCESS PDU SESSION

(71) Applicant: MEDIATEK INC., Hsin-Chu (TW)

(72) Inventors: Chia-Lin Lai, Hsin-Chu (TW); Chien-Chun Huang-Fu, Hsin-Chu (TW)

(73) Assignee: MediaTek INC., Hsin-Chu (TW)

(*) Notice: Subject to any disclaimer, the term of this patent is extended or adjusted under 35 U.S.C. 154(b) by 0 days.

(21) Appl. No.: 17/110,462

(22) Filed: Dec. 3, 2020

(65) Prior Publication Data
US 2021/0092664 A1 Mar. 25, 2021

Related U.S. Application Data

(63) Continuation-in-part of application No. 16/903,589, filed on Jun. 17, 2020.
(Continued)

(51) Int. Cl.
H04W 36/32 (2009.01)
H04W 36/22 (2009.01)
(Continued)

(52) U.S. Cl.
CPC .......... H04W 36/32 (2013.01); H04W 8/08 (2013.01); H04W 36/22 (2013.01); H04W 48/16 (2013.01);
(Continued)

(58) Field of Classification Search
CPC ....... H04W 36/32; H04W 8/08; H04W 36/22; H04W 48/16; H04W 60/04; H04W 76/36;
(Continued)

(56) References Cited

U.S. PATENT DOCUMENTS

2019/0159157 A1  5/2019 Gupta
2019/0274178 A1  9/2019 Salkintzis et al.
(Continued)

FOREIGN PATENT DOCUMENTS

CN  109673024 A  10/2017
EP  3611967 A1   9/2017
(Continued)

OTHER PUBLICATIONS

Taiwan IP Office prepared Search Report and Written Opinion for 109147049 dated Oct. 14, 2021 (3 pages). No English Translation available.
(Continued)

*Primary Examiner* — Marisol Figueroa
(74) *Attorney, Agent, or Firm* — Imperium Patent Works; Zheng Jin

(57) ABSTRACT

A method of handling multi-access (MA) Protocol data unit (PDU) session handover is proposed. A UE and network can support Access Traffic Steering Switching and Splitting (ATSSS) functionalities to distribute traffic over 3GPP access and non-3GPP access for the established MA PDU session. An ATSSS-Supported UE first establishes a MA PDU Session on both 3GPP and non-3GPP access in a currently registered PLMN which is an ATSSS-Supported network. The UE then moves from the ATSSS-Supported network to an ATSSS-not-Supported network and finally reaches another ATSSS-Supported network. In one novel aspect, a solution is provided on how to handle the ongoing MA PDU Session with two accesses under handover scenarios between ATSSS-Supported and ATSSS-not-Supported networks. Furthermore, if the ongoing MA PDU Session cannot handover, a solution is provided on how to handle the MA PDU Session.

16 Claims, 9 Drawing Sheets

Related U.S. Application Data

(60) Provisional application No. 62/866,712, filed on Jun. 26, 2019, provisional application No. 62/862,755, filed on Jun. 18, 2019.

(51) Int. Cl.
*H04W 8/08* (2009.01)
*H04W 76/36* (2018.01)
*H04W 60/04* (2009.01)
*H04W 48/16* (2009.01)
*H04W 84/04* (2009.01)

(52) U.S. Cl.
CPC ........... *H04W 60/04* (2013.01); *H04W 76/36* (2018.02); *H04W 84/042* (2013.01)

(58) Field of Classification Search
CPC ... H04W 84/042; H04W 88/06; H04W 76/16; H04W 36/0022; H04W 36/0027; H04W 60/005; H04W 76/11; H04W 36/0011; H04W 28/0846; H04W 36/14
See application file for complete search history.

(56) References Cited

U.S. PATENT DOCUMENTS

| | | |
|---|---|---|
| 2019/0394833 A1 | 12/2019 | Talebi Fard et al. |
| 2020/0092710 A1 | 3/2020 | Kim et al. |
| 2020/0112522 A1 | 4/2020 | Dannebro et al. |
| 2020/0178196 A1 | 6/2020 | Wang et al. |
| 2020/0245383 A1 | 7/2020 | Lu et al. |
| 2021/0136717 A1* | 5/2021 | Zhu ..................... H04W 60/005 |
| 2021/0289403 A1* | 9/2021 | Suh ..................... H04W 36/125 |

FOREIGN PATENT DOCUMENTS

| | | |
|---|---|---|
| WO | WO2018199668 A1 | 4/2017 |
| WO | WO2018206647 A1 | 5/2017 |
| WO | WO2019011398 A1 | 7/2017 |
| WO | WO2019032972 A1 | 8/2017 |
| WO | WO2019061110 A1 | 9/2017 |

OTHER PUBLICATIONS

International Search Report and Written Opinion of International Search Authority for PCT/CN2020/096866 dated Aug. 21, 2020 (9 pages).

S2-187841 3GPP TSG-SA WG2 Meeting #128bis, OPPO, "New Solution: Interworking of multi-Access PDU Session", Sophia Antipolis, France, Aug. 20-24, 2018 (4 pages) *section 1.3*.

International Search Report and Written Opinion of International Search Authority for PCT/CN2020/096868 dated Sep. 7, 2020 (10 pages).

S2-189041 3GPP TSG-SA WG2 Meeting #128bis, OPPO, "New Solution: interworking of Multi Access PDU Session", Sophia Antipolis, France, Aug. 20-24, 2018 (4 pages) *6.X.2.3*.

S2-1903136 SA WG2 Meeting #132, Telstra et al., "ATSSS functionality in presence of EPS interworking", Xi'an, China, Apr. 8-12, 2019 (4 pages) *5.32.Y.2.1, 5.32.Y.3*.

* cited by examiner

HANDOVER HANDLING FOR MULTI-ACCESS PDU SESSION

CROSS REFERENCE TO RELATED APPLICATIONS

This application is a continuation-in-part of, and claims priority under 35 U.S.C. 120 from nonprovisional U.S. patent application Ser. No. 16/903,589, entitled "Handling of Multi-Access PDU Session when Inter-System Change," filed on Jun. 17, 2020, the subject matter of which is incorporated herein by reference. Application Ser. No. 16/903,589, in turn, claims priority under 35 U.S.C. § 119 from U.S. Provisional Application No. 62/862,755, entitled "Enhancement for Multi-Access PDU Session", filed on Jun. 18, 2019; U.S. Provisional Application No. 62/866,712, entitled "Handling of MA PDU Session When Inter-System Change", filed on Jun. 26, 2019, the subject matter of each of the forgoing documents is incorporated herein by reference.

TECHNICAL FIELD

The disclosed embodiments relate generally to wireless communication, and, more particularly, to method of handling of Multi-Access (MA) PDU session handover between different PLMNs (Public Land Mobile Networks) and AMFs (Access Management Functions) in 5G New Radio (NR) communication networks.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. The Next Generation Mobile Network (NGMN) board, has decided to focus the future NGMN activities on defining the end-to-end requirements for 5G new radio (NR) systems.

In 5G/NR, a Protocol Data Unit (PDU) session defines the association between the UE and the data network that provides a PDU connectivity service. The PDU session establishment is a parallel procedure of PDN connection (bearer) procedure in 4G/LTE. Each PDU session identified by a PDU session ID (PSI), and may include multiple QoS flows and QoS rules. Each PDU session can be established via a 5G Access Network (e.g., 3GPP radio access network (RAN), or via a non-3GPP RAN). The network/UE can initiate different PDU session procedures, e.g., PDU session establishment, PDU session modification, and PDU session release. Due to new radio conditions, load balancing, or due to specific service, different handover procedures and inter-system change are used to handover a UE from a source 5G access network to a target 5G access or to a target 4G access network.

Operators are seeking ways La balance data traffic between mobile networks and non-3GPP access in a way that is transparent to users and reduces mobile network congestion. In 5GS, UEs that can be simultaneously connected to both 3GPP access and non-3GPP access (using 3GPP NAS signalling), thus the 5GS is able to take advantage of these multiple accesses to improves the user experience, optimizes the traffic distribution across various accesses. Accordingly, 3GPP introduced Multi-Access (MA) PDU session in 5GS. A MA PDU session uses one 3GPP access network or one non-3GPP access network at a time, or simultaneously one 3GPP access network and one non-3GPP access network. In addition, the UE and network can support Access Traffic Steering Switching and Splitting (ATSSS) functionalities to distribute traffic over 3GPP access and non-3GPP access for the established MA PDU session. However, UE behavior is undefined on how to handle the MA PDU session when inter-system changes from 5GS to EPS.

An ATSSS-supported UE first establishes a MA PDU Session on both 3GPP and non-3GPP access in a currently registered PLMN which is an ATSSS-supported network. The UE then moves from the ATSSS-supported network to an ATSSS-not-supported network and finally reaches another ATSSS-supported network. It is undefined how the network and UE handle the ongoing MA PDU Session with two accesses under handover scenarios between ATSSS-supported and ATSSS-not-supported networks. Furthermore, if the ongoing MA PDU Session cannot handover, it is undefined how the network and UE handle the MA PDU Session.

SUMMARY

A method of handling multi-access (MA) Protocol data unit (PDU) session under inter-system change is proposed. An MA PDU session uses one 3GPP access network or one non-3GPP access network at a time, or simultaneously one 3GPP access network and one non-3GPP access network. The UE and network can support Access Traffic Steering Switching and Splitting (ATSSS) functionalities to distribute traffic over 3GPP access and non-3GPP access for the established MA PDU session. Upon intersystem change from 5GS to EPS over the 3GPP access, if interworking with EPS is supported, the 3GPP part of an MA PDU session is transferred to a PDN connection, and the non-3GPP part of the MA PDU session is released. The QoS flows of the MA PDU session over both 3GPP access type and non-3GPP access type are transferred to the EPS bearer contexts of the corresponding PDN connection. On the other hand, if interworking with EPS is not supported, the MA PDU session is maintained in 5GS over non-3GPP access type. Data traffic of the MA PDU session over the 3GPP access type is transferred to the non-3GPP access type.

In one embodiment, a UE performs registration in a 5G mobile communication network. The UE establishes a multi-access (MA) Protocol data unit (PDU) session in 5G system (5GS). The MA PDU session has a PDU session ID (PSI) and is established over both a first radio access technology (RAT) access type and a second RAT access type. The UE performs an inter-system change from 5GS to evolved packet system (EPS). The UE transfers the MA PDU session to a corresponding Packet Data Network (PDN) connection over the first RAT access type in EPS. The MA PDU session over the first RAT access type is transferred to the PDN connection and the MA PDU session over the second RAT access type is released.

In another embodiment, a UE performs registration in a 5G mobile communication network. The UE establishes a multi-access (MA) Protocol data unit (PDU) session in 5G system (5GS). The MA PDU session has a PDU session ID (PSI) and is established over both a first radio access technology (RAT) access type and a second RAT access type. The UE performs an inter-system change from 5GS to evolved packet system (EPS). The UE determines that the MA PDU session is not converted to a corresponding protocol data network (PDN) connection in EPS. Data traffic over the first RAT access type of the MA PDU session is then transferred to the second RAT access type in 5GS.

In one novel aspect, An ATSSS-supported UE first establishes a MA PDU Session on both 3GPP and non-3GPP access in a currently registered PLMN which is an ATSSS-supported network. The UE then moves from the ATSSS-supported network to an ATSSS-not-supported network and finally reaches another ATSSS-supported network. In one novel aspect, a solution is provided on how to handle the ongoing MA PDU Session with two accesses under handover scenarios between ATSSS-supported and ATSSS-not-supported networks. Furthermore, if the ongoing MA PDU Session cannot handover, a solution is provided on how to handle the MA PDU Session.

In one embodiment, a UE performs registration in a first public land mobile network (PLMN) connecting to a first access management function (AMF) that supports Access Traffic Steering Switching and Splitting (ATSSS). The UE establishes a multi-access (MA) Protocol data unit (PDU) session in the first PLMN. The MA PDU session is established over both a first radio access technology (RAT) access type and a second RAT access type. The UE determines whether to maintain the MA PDU session when moving from the first PLMN/AMF to a second PLMN/AMF that does not support ATSSS. The UE locally releases the MA PDU session over the first RAT access part based on an ATSSS-not-supported indicator received from the second PLMN/AMF.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
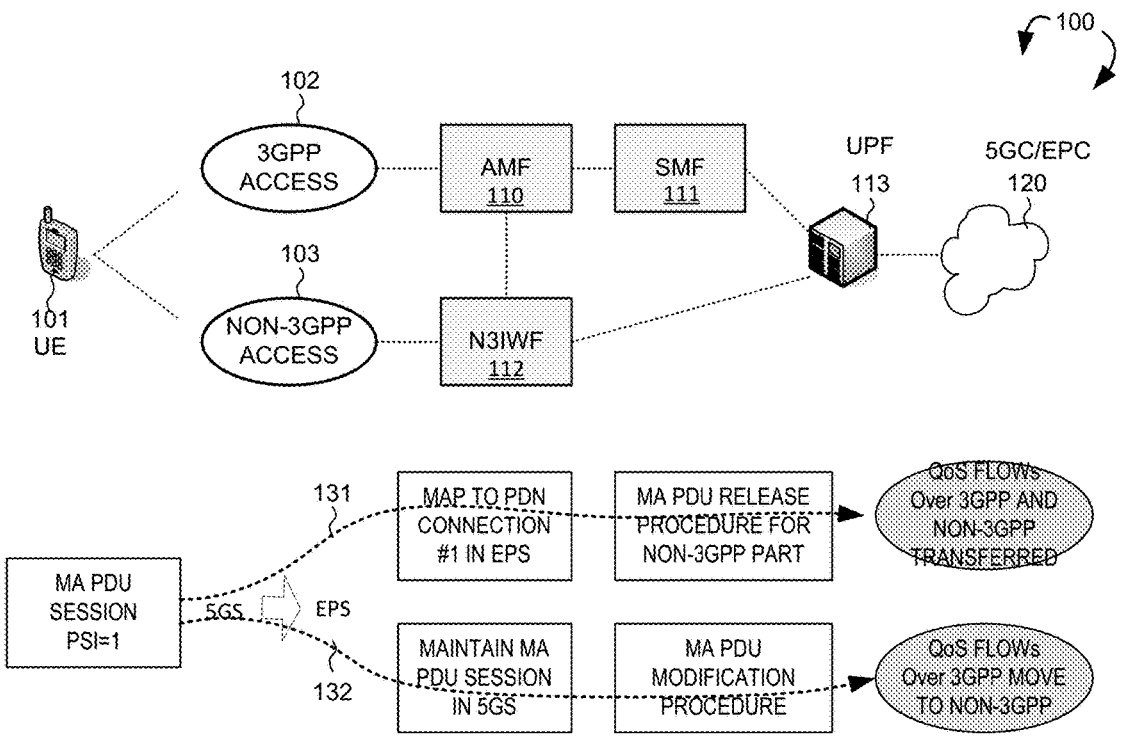
FIG. 1 illustrates an exemplary 5G network supporting Multi-Access Protocol Data Unit (MA PDU) session management with inter-system change in accordance with one novel aspect.

FIG. 1 illustrates an exemplary 5G network 100 supporting Multi-Access Protocol Data Unit (MA PDU) session management with inter-system change in accordance with one novel aspect. 5G new radio (NR) network 100 comprises a user equipment UE 101, a 3GPP radio access network RAN 102, a non-3GPP radio access network RAN 103, an Access and Mobility Management Function (AMF) 110, a Session Management Function (SMF) 111, an Non-3GPP Interworking Function (N3IWF) 112, a User Plane Function (UPF) 113, and a 5G core (5GC) or Evolved Packet core (EPC) data network 120. The AMF communicates with the base station, SMF and UPF for access and mobility management of wireless access devices in mobile communication network 100. The SMF is primarily responsible for interacting with the decoupled data plane, creating, updating and removing Protocol Data Unit (PDU) sessions and managing session context with the UPF. The N3IWF functionality interfaces to 5G core network control plane functions, responsible for routing messages outside 5G RAN.

In Access Stratum (AS) layer, RAN provides radio access for UE 101 via a radio access technology (RAT). In Non-Access Stratum (NAS) layer, AMF and SMF communicate with RAN and 5GC/EPC for access and mobility management and PDU session management of wireless access devices in 5G network 100. 3GPP Radio access network RAN 102 may include base stations (gNBs or eNBs) providing radio access for UE 101 via various 3GPP RATS including 5G, 4G, and 3G/2G. Non-3GPP radio access network RAN 103 may include access points (APs) providing radio access for UE 101 via non-3GPP RAT including WiFi. UE 101 can obtain access to data network 120 through 3GPP access 102, AMF 110, SMF 111, and UPF 113. UE 101 can obtain access to data network 120 through non-3GPP access 103, N3IWF 112, AMF 110, SMF 111, and UPF 113. UE 101 may be equipped with a single radio frequency (RF) module or transceiver or multiple RF modules or transceivers for services via different RATs/CNs. UE 101 may be a smart phone, a wearable device, an Internet of Things (IoT) device, a tablet, etc.

5GS networks are packet-switched (PS) Internet Protocol (IP) networks. This means that the networks deliver all data traffic in IP packets, and provide users with Always-On IP Connectivity. When UE joins an EPS network, a Packet Data Network (PDN) address (i.e., the one that can be used on the PDN) is assigned to the UE for its connection to the PDN. In 4G, EPS has defined a Default EPS bearer to provide the IP Connectivity that is Always-On. In 5G, a Protocol Data Unit (PDU) session establishment procedure is a parallel procedure of a PDN connection procedure in 4G. A PDU session defines the association between the UE and the data network that provides a PDU connectivity service. Each PDU session is identified by a PDU session ID, and may include multiple QoS flows and QoS rules. In 5G network, QoS flow is the finest granularity for QoS management to enable more flexible QoS control. The concept of QoS flow in 5G is like EPS bearer in 4G.

Each PDU session can be established over a 3GPP RAN, or over a non-3GPP RAN for radio access. 5G Session management (5GSM) for PDU sessions over both 3GPP access and non-3GPP access are managed by AMF and SMF via NAS signaling. Operators are seeking ways to balance data traffic between mobile networks and non-3GPP access in a way that is transparent to users and reduces mobile network congestion. In 5GS, UEs that can be simultaneously connected to both 3GPP access and non-3GPP access (using 3GPP NAS signalling), thus the 5GS is able to take advantage of these multiple accesses to improves the user experience, optimizes the traffic distribution across various accesses. Accordingly, 3GPP introduced Multi-Access (MA) PDU session in 5GS. A MA PDU session uses one 3GPP access network or one non-3GPP access network at a time, or simultaneously one 3GPP access network and one non-3GPP access network. In addition, the UE and the network can support Access Traffic Steering Switching and Splitting (ATSSS) functionalities to distribute traffic over 3GPP access and non-3GPP access for the established MA PDU session.

When a MA PDU session is established in 5GS, it includes a number of QoS flows in Non-Access Stratum (NAS) layer. Each QoS flow may be mapped to a corresponding EPS bearer. In addition, based on ATSSS rules, each QoS flow may use 3GPP access or non-3GPP access. When a QoS flow is added, the network can provide a QoS flow description IE to the UE, which comprises a list of QoS flow descriptions. Each QoS flow description comprises a QoS flow identifier (QFI), a QoS flow operation code, a number of QoS flow parameters, and a QoS flow parameters list. Each parameter included in the parameters list consists of a parameter identifier that identifies the corresponding parameter. One of the parameter identifiers is the EPS bearer identity (EBI), which is used to identify the EPS bearer that is mapped to or associated with the QoS flow. However, if an MA PDU session does not support interworking with EPS, then there are no associated ESM parameters, e.g., EBI, mapped EPS bearer contexts, when inter-system change from 5GS to EPS over 3GPP access.

After inter-system change from N1 (5GS) mode to S1 (4G, EPS) mode, if interworking with EPS is supported, then a PDU session in 5GS is transferred to a corresponding PDN connection in EPS, and QoS flows of the PDU session are mapped to associated EPS bearers. The default EPS bearer context includes a PDU session identity (PSI), S-NSSAI, session AMBR and one or more QoS flow descriptions received in the Protocol configuration options IE or Extended protocol configuration options IE, or the default EPS bearer context has association with the PDU session identity, the S-NSSAI, the session-AMBR and one or more QoS flow descriptions. However, UE behavior is undefined on how to handle a MA PDU session when inter-system changes from 5GS to EPS, regardless of interworking with EPS is supported or not.

In accordance with one novel aspect, if interworking with EPS is supported, and if the MA PDU session in 5GS is over both 3GPP and non-3GPP access (i.e., the MA PDU session is established and the user plane resources of the MA PDU session on both 3GPP access and non-3GPP access are successfully established), upon intersystem change from 5GS to EPS over the 3GPP access, the 3GPP part of the PDU session is transferred to the PDN connection, and the non-3GPP part of the PDU session is released. The QoS flows of the MA PDU session over both 3GPP access and non-3GPP access are transferred to the EPS bearer contexts of the corresponding PDN connection. As depicted by arrowed line 131, MA PDU session with PSI=1 in 5GS is transferred to PDN connection #1 in EPS. All the QoS flows with EBI assigned over 3GPP and non-3GPP access are transferred to the PDN connection #1 in EPS. User plane resources of the MA PDU session over non-3GPP access are released in 5GS via a PDU session release procedure, and the ATSSS rules are released. On the other hand, if interworking with EPS is not supported, and if the MA PDU session in 5GS is over both 3GPP and non-3GPP access, upon intersystem change from 5GS to EPS over the 3GPP access, the MA PDU session is maintained in 5GS over non-3GPP access, and data traffic of the MA PDU session over 3GPP access is moved to non-3GPP access in 5GS. As depicted by arrowed line 132, MA PDU session with PSI=1 in 5GS is maintained in 5GS and not transferred to any PDN connection in EPS. Optionally, through a PDU session modification procedure initiated by the network or by the UE, data traffic of the MA PDU session over 3GPP access is moved to non-3GPP access. In some steering modes, the 3GPP traffic can be moved to non-3GPP access by the UE directly, without the PDU session modification procedure.

Figure 2:
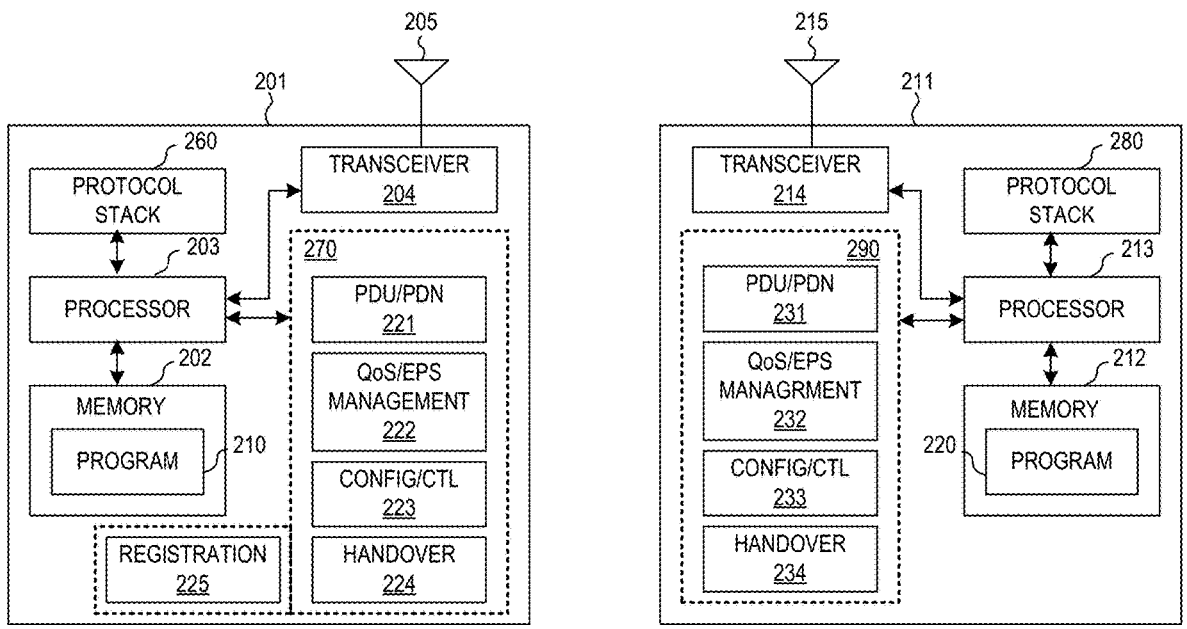
FIG. 2 illustrates simplified block diagrams of a user equipment (UE) and a network entity in accordance with embodiments of the current invention.

FIG. 2 illustrates simplified block diagrams of wireless devices, e.g., a UE 201 and a network entity 211 in accordance with embodiments of the current invention. Network entity 211 may be a base station and/or an AMF/SMF. Network entity 211 has an antenna 215, which transmits and receives radio signals. A radio frequency RF transceiver module 214, coupled with the antenna, receives RF signals from antenna 215, converts them to baseband signals and sends them to processor 213. RF transceiver 214 also converts received baseband signals from processor 213, converts them to RF signals, and sends out to antenna 215. Processor 213 processes the received baseband signals and invokes different functional modules to perform features in base station 211. Memory 212 stores program instructions and data 220 to control the operations of base station 211. In the example of FIG. 2, network entity 211 also includes protocol stack 280 and a set of control functional modules and circuit 290. PDU session and PDN connection handling circuit 231 handles PDU/PDN establishment and modification procedures. QoS and EPS bearer management circuit 232 creates, modifies, and deletes QoS and EPS bearers for UE. Configuration and control circuit 233 provides different parameters to configure and control UE of related functionalities including mobility management and PDU session management, handover module 234 handles handover and inter-system change functionalities between 5GS and EPS.

Similarly, UE 201 has memory 202, a processor 203, and radio frequency (RF) transceiver module 204. RF transceiver 204 is coupled with antenna 205, receives RF signals from antenna 205, converts them to baseband signals, and sends them to processor 203. RF transceiver 204 also converts received baseband signals from processor 203, converts them to RF signals, and sends out to antenna 205. Processor 203 processes the received baseband signals and invokes different functional modules and circuits to perform features in UE 201. Memory 202 stores data and program instructions 210 to be executed by the processor to control the operations of UE 201. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines. A processor in associated with software may be used to implement and configure features of UE 201.

UE 201 also comprises a set of functional modules and control circuits to carry out functional tasks of UE 201. Protocol stacks 260 comprise Non-Access-Stratum (NAS) layer to communicate with an AMF/SMF/MME entity connecting to the core network, Radio Resource Control (RRC) layer for high layer configuration and control, Packet Data Convergence Protocol/Radio Link Control (PDCP/RLC) layer, Media Access Control (MAC) layer, and Physical (PHY) layer. System modules and circuits 270 may be implemented and configured by software, firmware, hardware, and/or combination thereof. The function modules and circuits, when executed by the processors via program instructions contained in the memory, interwork with each other to allow UE 201 to perform embodiments and functional tasks and features in the network.

In one example, system modules and circuits 270 comprise PDU session and PDN connection handling circuit 221 that performs PDU session and PDN connection establishment and modification procedures with the network, a QoS flow and EPS bearer handling circuit 222 that manages, creates, modifies, and deletes QoS flows and mapped EPS bearer contexts, a config and control circuit 223 that handles configuration and control parameters for mobility management and session management, a handover module that handles handover and intersystem change, and a registration module that performs registration with the network. In one example, if interworking is supported and if the MA PDU session is over both 3GPP and non-3GPP access, upon inter-system change from 5GS to EPS over 3GPP access, the 3GPP part of the PDU session is transferred to the PDN connection, and the non-3GPP part of the PDU session is released. The QoS flows of the MA PDU session over both 3GPP access and non-3GPP access are transferred to the EPS bearer contexts of the corresponding PDN connection. In another example, if interworking is not supported and if the MA PDU session is over both 3GPP and non-3GPP access, upon inter-system change from 5GS to EPS over 3GPP access, the MA PDU session is maintained in 5GS over non-3GPP access, and data traffic of the MA PDU session over 3GPP access is moved to non-3GPP access. In yet another example, when a UE moves from ATSSS-supported PLMN/AMF to ATSSS non-supported PLMN/AMF, the UE locally releases the MA PDU Session when the UE receives an ATSSS support indicator and PDU Session status without signaling exchange with network.

Figure 3:
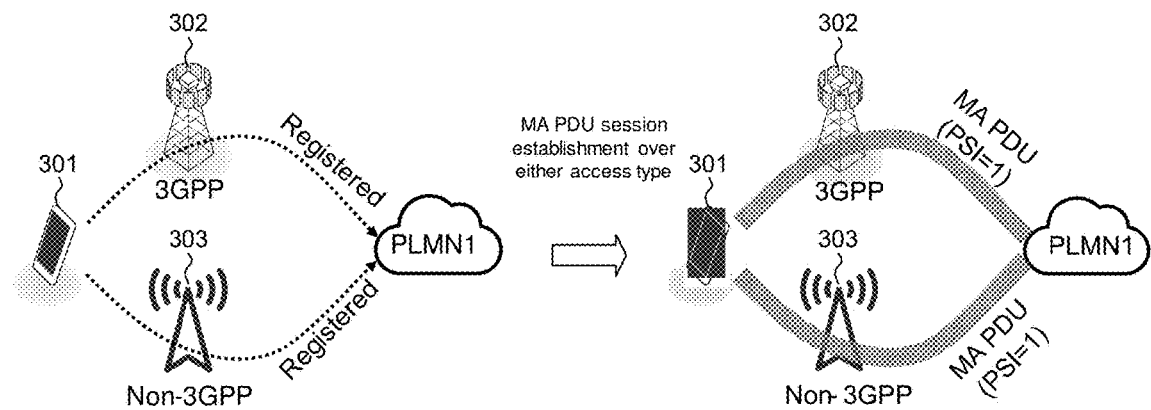
FIG. 3 illustrates one embodiment of establishing a MA PDU session in 5GS after a UE is registered to the network over both 3GPP and non-3GPP access type belonging to the same PLMN.

FIG. 3 illustrates one embodiment of establishing a MA PDU session in 5GS after a UE is registered to the network over both 3GPP and non-3GPP access type belonging to the same PLMN. UE 301 is registered over 3GPP access type to PLMN1 through a 3GPP base station gNB 302. UE 301 is also registered over non-3GPP access type to PLMN1 through a non-3GPP access point AP 303. UE 301 establishes a MA PDU session by initiating a PDU session establishment procedure with the network over either 3GPP or non-3GPP access type. The activation of the MA PDU connectivity service refers to the establishment of user-plane resources on both 3GPP access and non-3GPP access. Since UE 301 is registered to the network over both RAT access types belonging to the same PLMN1, the MA PDU session with PSI=1 is established over both 3GPP and non-3GPP access types, and then the user-plane resources are established over both 3GPP and non-3GPP access types.

Figure 4:
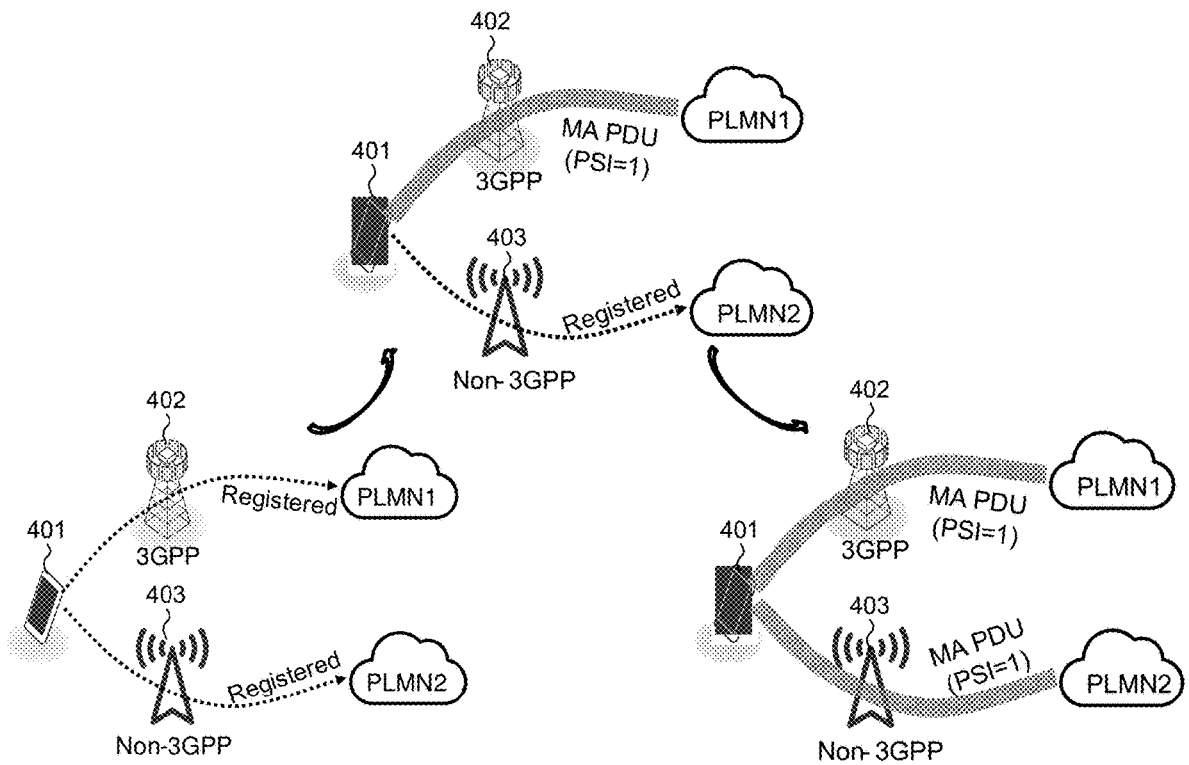
FIG. 4 illustrates one embodiment of establishing a MA PDU session in 5GS after a UE is registered to the network over both 3GPP and non-3GPP access type belonging to different PLMNs.

FIG. 4 illustrates one embodiment of establishing a MA PDU session in 5GS after a UE is registered to the network over both 3GPP and non-3GPP access type belonging to different PLMNs. UE 401 is registered over 3GPP access type to a first PLMN1 through a 3GPP base station gNB 402. UE 401 is also registered over non-3GPP access type to a second PLMN2 through a non-3GPP access point AP 403. UE 401 establishes a MA PDU session by initiating a PDU session establishment procedure with the network over one of the access types, e.g., 3GPP access type. For example, UE 401 sends a PDU SESSION ESTABLISHMENT REQUEST message to gNB 402, with a request type IE set to "MA PDU request" and with PSI=1. The user plane resource on 3GPP access is then established. Next, UE 401 sends another PDU SESSION ESTABLISHMENT REQUEST message to AP 403, with a request type IE set to "MA PDU request" and with the same PSI=1. The user plane resource on non-3GPP access is then established. Since UE 401 is registered to the network over both RAT access types belonging to different PLMNs, the MA PDU session with PSI=1 is first established over 3GPP access type and then established over non-3GPP access type in two separate steps.

Figure 5:
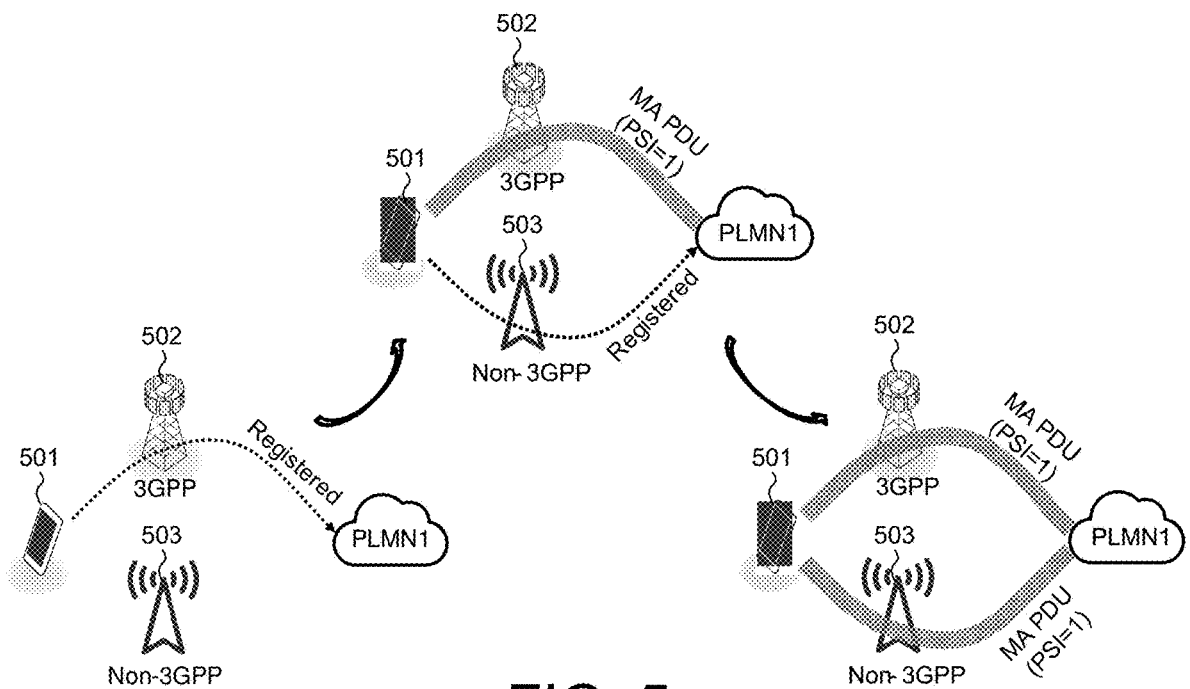
FIG. 5 illustrates another embodiment of establishing a MA PDU session in 5GS when a UE is registered to one RAT access type and then registered to another RAT access type.

FIG. 5 illustrates another embodiment of establishing a MA PDU session in 5GS when a UE is registered to one RAT access type and then registered to another RAT access type to the same PLMN. UE 501 is registered over 3GPP access type to a first PLMN1 through a 3GPP base station gNB 502. UE 501 is not registered over non-3GPP access type to PLMN1. UE 501 then establishes a MA PDU session by initiating a PDU session establishment procedure with the network over 3GPP access type. For example, UE 501 sends a PDU SESSION ESTABLISHMENT REQUEST message to gNB 502, with a request type IE set to "MA PDU request" and with PSI=1. The user plane resource on 3GPP access is then established. Later, UE 501 is registered over non-3GPP access type to the same PLMN1 through a non-3GPP access point AP 503. UE 501 sends another PDU SESSION ESTABLISHMENT REQUEST message to AP 503, with a request type IE set to "MA PDU request" and with the same PSI=1. The user plane resource on non-3GPP access is then established. As a result, UE 501 establishes the MA PDU session to the same PLMN1 with PSI=1 over both 3GPP access type and non-3GPP access type in two separate steps.

Figure 6:
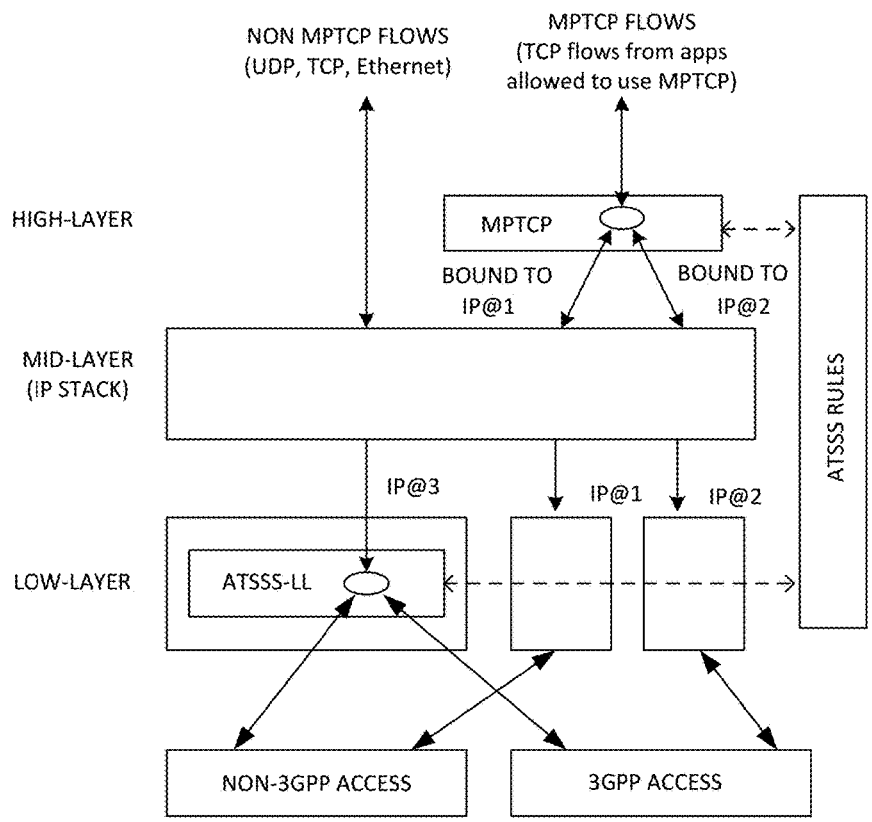
FIG. 6 illustrates a simplified block diagram of a UE supporting MPTCP functionality operates above the IP layer and/or ATSSS functionality operates below the IP layer as a data switching function.

FIG. 6 illustrates a simplified block diagram of a UE supporting MPTCP functionality operates above the IP layer and/or ATSSS functionality operates below the IP layer as a data switching function. The UE and the network can support one or more of the steering functionalities for MA PDU session. The MPTCP functionality operates above the IP layer, while the ATSSS-LL functionality operates below the IP layer as a data switching function. As depicted in FIG. 6, in higher-layer, the MPTCP functionality checks the ATSSS rules, and MPTCP flows (TCP flows from apps allowed to use MPTCP) are split into subflows bound to different IP in middle-layer (e.g., IP stack) and low-layer and then steered or switched to non-3GPP access or 3GPP access. For non MPTCP flows (e.g., UDP, TCP, Ethernet flows), in low-layer, the ATSSS-LL functionality checks the ATSSS rules, and splits, steers, or switches the traffic flows to non-3GPP or 3GPP access.

In an ATSSS capable UE, the ATSSS-LL requirements are as follows. For an MA PDU session of Ethernet PDU session type, the ATSSS-LL functionality is mandatory. For an MA PDU session of IPv4, IPv6, or IPv4v6 PDU session type, if the UE does not support the MPTCP functionality, the ATSSS-LL functionality is mandatory. If the UE supports the MPTCP functionality, only the active-standby steering mode of the ATSSS-LL functionality is mandatory. All other steering modes are optional. The ATSSS rules are provided by the network in 5GSM messages, e.g., in PDU SESSION ESTABLISHMENT ACCEPT or PDU SESSION MODIFICATION COMMAND message. The parameters of the ATSSS rules includes rule precedence that determines the order in which the ATSSS rule is evaluated in UE, traffic descriptor, application descriptor, IP descriptors, access selection descriptors, steering mode that identifies the steering mode (active-standby, smallest delay, load balancing, priority based) that should be applied for the matching traffic, and steering functionality that identifies whether the MPTCP functionality or the ATSSS-LL functionality should be applied for the matching traffic. Examples of ATSSS rules include: 1. "Traffic Descriptor: UDP, DestAddr 1.2.3.4", "Steering Mode: Active-Standby, Active=3GPP, Standby=non-3GPP"—This rule means "steer UDP traffic with destination IP address 1.2.3.4 to the active access (3GPP), if available. If the active access is not available, use the standby access (non-3GPP)". 2. "Traffic Descriptor: TCP, DestPort 8080", "Steering Mode: Smallest Delay"—This rule means "steer TCP traffic with destination port 8080 to the access with the smallest delay". The UE needs to measure the RTT over both accesses, in order to determine which access has the smallest delay. "Traffic Descriptor: Application-1", "Steering Mode: Load-Balancing, 3GPP=20%, non-3GPP=80%", "Steering Functionality: MPTCP"—This rule means "send 20% of the traffic of Application-1 to 3GPP access and 80% to non-3GPP access by using the MPTCP functionality".

Figure 7:
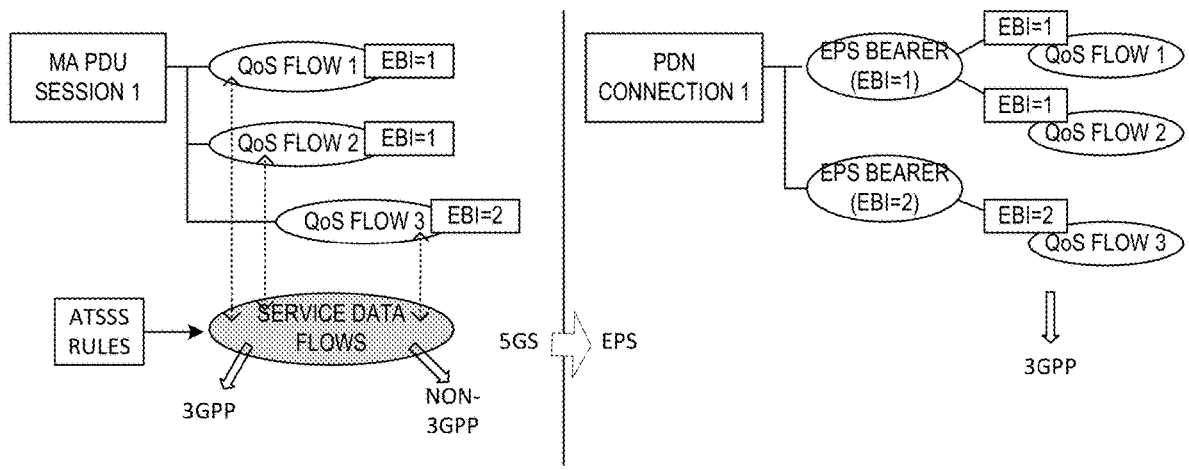
FIG. 7 illustrates one embodiment of inter-system change from 5GS to EPS and QoS flow handling when an MA PDU session is converted to a PDN connection.

FIG. 7 illustrates one embodiment of inter-system change from 5GS to EPS and QoS flow handling when an MA PDU session is converted to a PDN connection. In 5GS, a UE establishes a MA PDU session with PSI=1, over both 3GPP and non-3GPP access. The MA PDU session is configured with three QoS flows and certain ATSSS rules for data traffic distribution. The granularity for ATSSS steering feature is per service data flow (SDF), not per QoS flow. The scope of SDF is independent from QoS flow. A QoS flow can include one or multiple SDFs, and an SDF can be distributed over one or multiple QoS flows. The ATSSS steering function decides which access (3GPP or non-3GPP) to send the traffic of an SDF. Upon inter-system change from 5GS to EPS, the user plane resource of the MA PDU session over 3GPP access is transferred to a corresponding PDN connection in EPS, and the user plane resource of the MA PDU session over non-3GPP access is released. All the three QoS flows of the MA PDU session are transferred to the corresponding PDN connection in EPS. The PDN connection 1 in EPS includes two EPS bearers: a default EPS bearer with EBI=1 is associated with QoS flow1 and QoS flow2, and a dedicated EPS bearer with EBI=2 is associated with QoS flow3.

Figure 8:
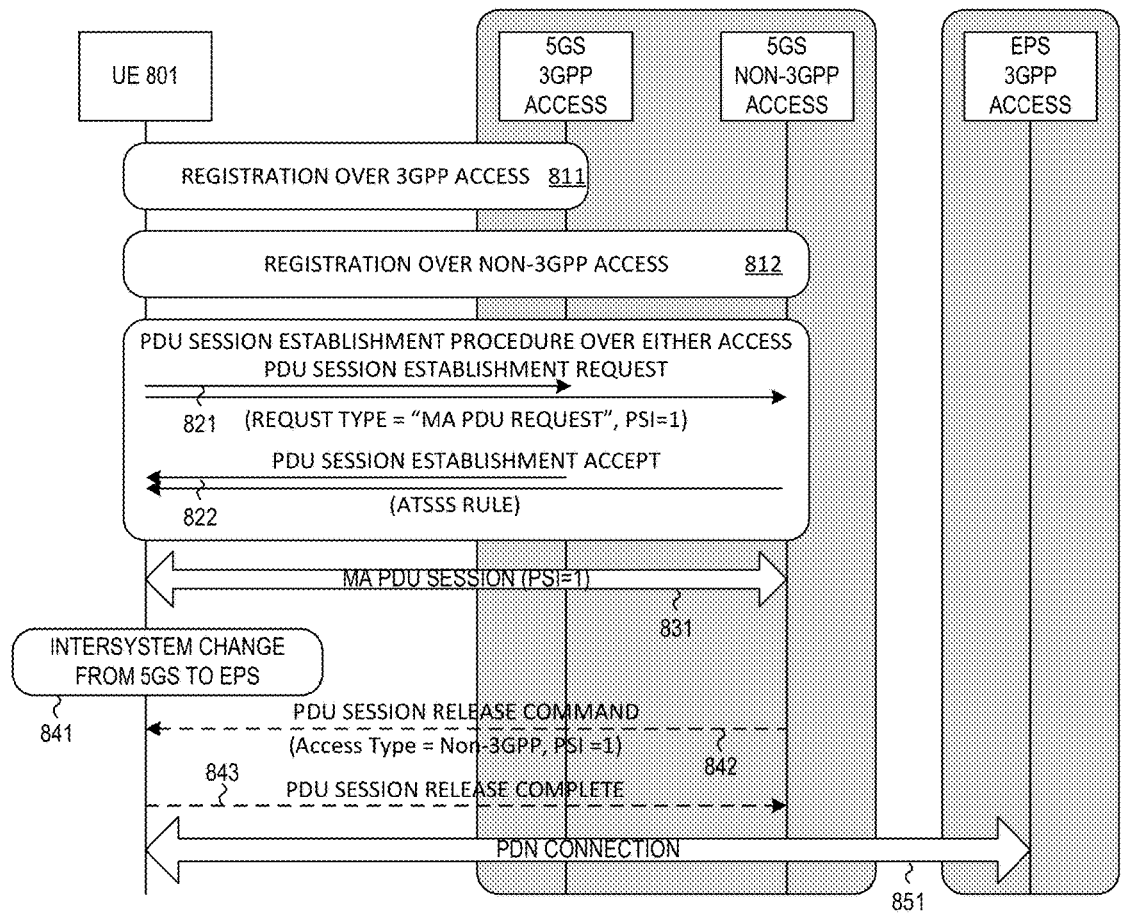
FIG. 8 illustrates a sequence flow between a UE and 5GS and EPS when a MA PDU session is converted to a PDN connection when intersystem change from 5GS to EPS in accordance with one novel aspect.

FIG. 8 illustrates a sequence flow between a UE 801 and 5GS and EPS when a MA PDU session is converted to a PDN connection when intersystem change from 5GS to EPS in accordance with one novel aspect. In step 811, UE 801 registers with the 5GS network over 3GPP access type. In step 812, UE 801 registers with the 5GS network over non-3GPP access type. The registered 5GS network belong to the same PLMN. In step 821, UE 801 initiates a PDU session establishment procedure by sending a PDU SESSION ESTABLISHMENT REQUEST message over either access type, to establish an MA PDU session with a request type IE set to "MA PDU request" and with PSI=1. In step 822, UE 801 receives a PDU SESSION ESTABLISHMENT ACCEPT message from the network over a corresponding access type, which carries Access Traffic Steering Switching and Splitting (ATSSS) rule. In step 831, the MA PDU session with PSI=1 is established between UE 801 and the 5GS over both 3GPP and non-3GPP access types. The ATSSS rules provide parameters for traffic steering, switching, and splitting functionalities between the 3GPP and non-3GPP access. Note that the establishment for an MA PDU session may require multiple steps, e.g., if the UE is registered with different PLMNs over different RATS.

In step 841, an inter-system change occurs for UE 801 to handover from 5GS to EPS. When UE 801 moves from 5GS to EPS, for both idle mode and connected mode mobility, the MA PDU session is moved to a corresponding PDN connection in EPS. The SMF triggers a PDU session release procedure to release the MA PDU session over non-3GPP access in 5GS, e.g., MA PDU session's user plane resource on non-3GPP access. In step 842, the network sends a PDU SESSION RELEASE COMMAND message to UE 801, with an access type IE set to "non-3GPP" and with PSI=1. In step 843, UE 801 transmits a PDU SESSION RELEASE COMPLETE message to the network. The user plane resource on non-3GPP access of the MA PDU session is then released, and the ATSSS rules are also released. Note that the PDU session release procedure of steps 842-843 may occur after step 851. In addition, the non-3GPP access part of the MA PDU session can be released locally by the UE without performing the PDU session release procedure. In step 851, the MA PDU session over 3GPP access is converted to a PDN connection in EPS for 3GPP access. Note that QoS flows with allocated EBIs of the MA PDU session using both 3GPP access and non-3GPP access are transferred to EPS bearer contexts of the corresponding PDN connection over 3GPP access. UE and SMF remove ATSSS related contexts, e.g., ATSSS rules, and measurement assistance information.

Figure 9:
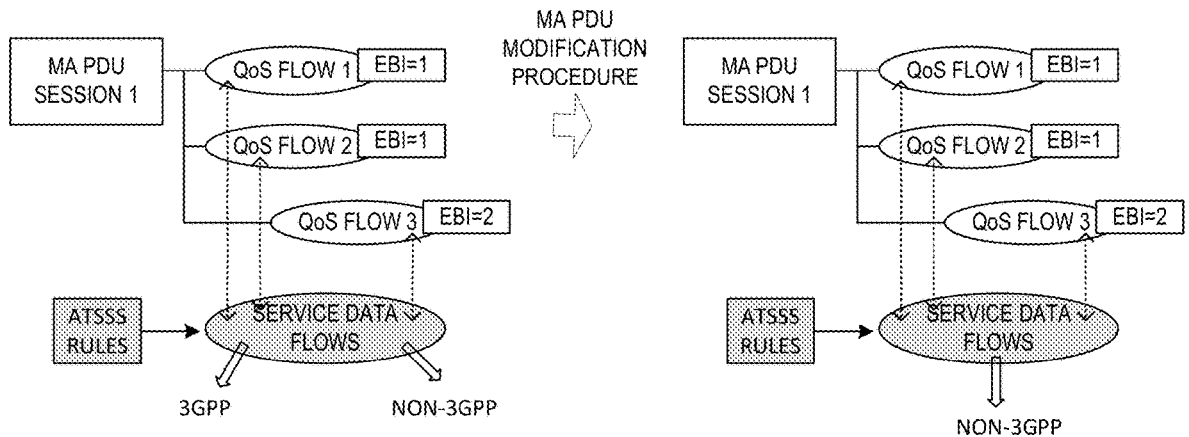
FIG. 9 illustrates one embodiment of inter-system change from 5GS to EPS and QoS flow handling when an MA PDU session is not converted to a PDN connection.

FIG. 9 illustrates one embodiment of inter-system change from 5GS to EPS and QoS flow handling when an MA PDU session is not converted to a PDN connection. In 5GS, a UE establishes a MA PDU session with PSI=1, over both 3GPP and non-3GPP access. The MA PDU session is configured with three QoS flows and certain ATSSS rules for data traffic distribution: QoS flow1 and QoS flow2 are created for 3GPP access, QoS flow3 is created for non-3GPP access. However, the UE does not support interworking for the MA PDU session, e.g., the QoS flows of the MA PDU session are not allocated with mapping EPS bearers of a corresponding PDN connection in EPS. Upon inter-system change from 5GS to EPS, the MA PDU session is maintained in 5GS and is not transferred to any PDN connection in EPS. The UE can move the data traffic of the MA PDU session from 3GPP access to non-3GPP access based on the steering mode of the ATSSS rule. For example, if the steering mode is active-standby, then UE can steer the SDF by using the active access if available, or using the standby access if the active access is not available. If the steering mode is smallest delay, then UE can steer the SDF using the access network with the smallest RTT. If the steering mode is load balancing, then UE can steer the SDF across both 3GPP and non-3GPP access. If only one access (e.g., non-3GPP) is available, the UE steers the SDF by using the available access. The network can also move the data traffic of the MA PDU session from 3GPP access to non-3GPP access via a PDU session modification procedure.

Figure 10:
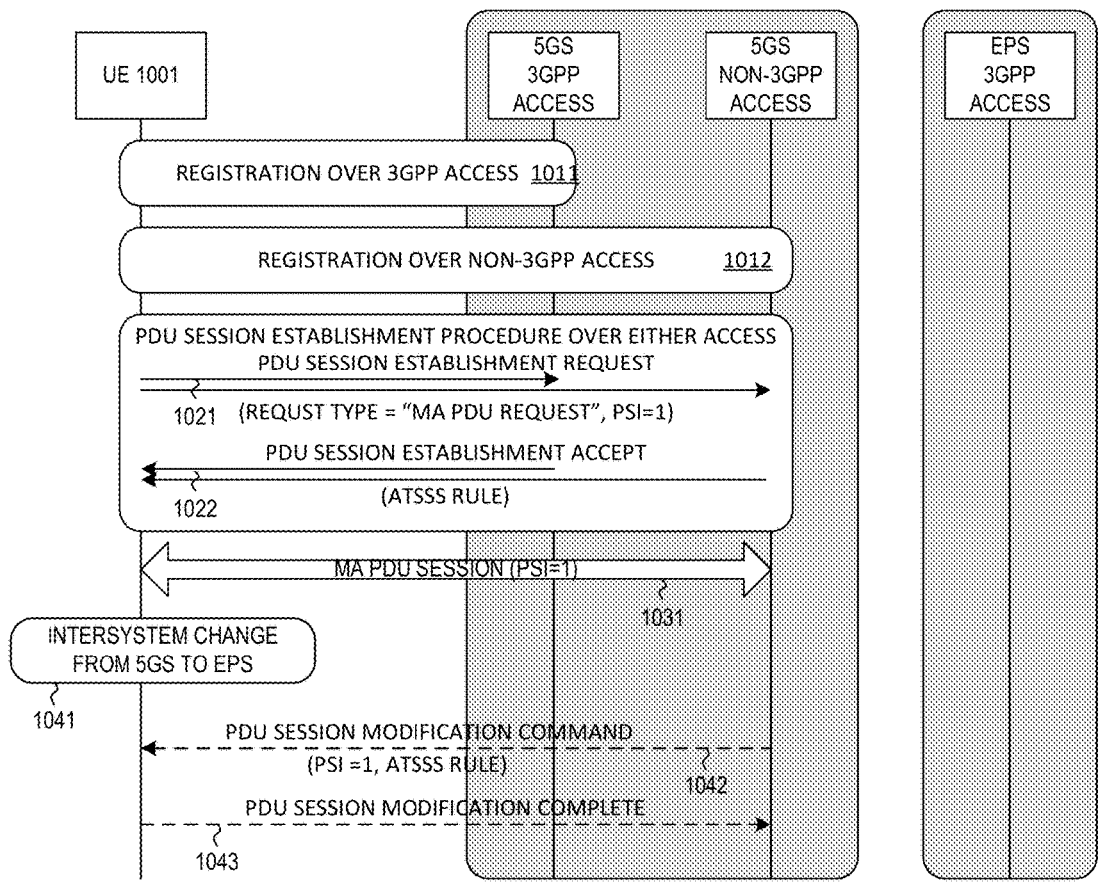
FIG. 10 illustrates a sequence flow between a UE and 5GS and EPS when a MA PDU session is not converted to a PDN connection when intersystem change from 5GS to EPS in accordance with one novel aspect.

FIG. 10 illustrates a sequence flow between a UE and 5GS and EPS when a MA PDU session is not converted to a PDN connection when intersystem change from 5GS to EPS in accordance with one novel aspect. In step 1011, UE 1001 registers with the 5GS network over 3GPP access type. In step 1012, UE 1001 registers with the 5GS network over non-3GPP access type. The registered 5GS network belong to the same PLMN. In step 1021, UE 1001 initiates a PDU session establishment procedure by sending a PDU SESSION ESTABLISHMENT REQUEST message over either access type, to establish an MA PDU session with a request type IE set to "MA PDU request" and with PSI=1. In step 1022, UE 1001 receives a PDU SESSION ESTABLISHMENT ACCEPT message from the network over a corresponding access type, which carries Access Traffic Steering Switching and Splitting (ATSSS) rule. In step 1031, the MA PDU session with PSI=1 is established between UE 1001 and the 5GS over both 3GPP and non-3GPP access types. The ATSSS rules provide parameters for traffic steering, switching, and splitting functionalities between the 3GPP and non-3GPP access. Note that the establishment for an MA PDU session may require multiple steps, e.g., if the UE is registered with different PLMNs over different RATS.

In step 1041, an inter-system change occurs for UE 1001 to handover from 5GS to EPS. When UE 1001 moves from 5GS to EPS, for both idle mode and connected mode mobility, the MA PDU session is maintained in 5GS over non-3GPP access. In step 1042, the network sends a PDU SESSION MODIFICATION COMMAND message to UE 1001. In step 1043, UE 1001 sends a PDU SESSION MODIFICATION COMPLETE message back to the network. Through the PDU session modification procedure, the network can modify the steering mode in the ATSSS rule so that, data traffic of the MA PDU session is moved from 3GPP access to non-3GPP access. Note that UE 1001 is capable to transfer the data traffic from 3GPP access to non-3GPP access by itself without the PDU session modification procedure, e.g., based on the steering mode in the ATSSS rule.

Figure 11:
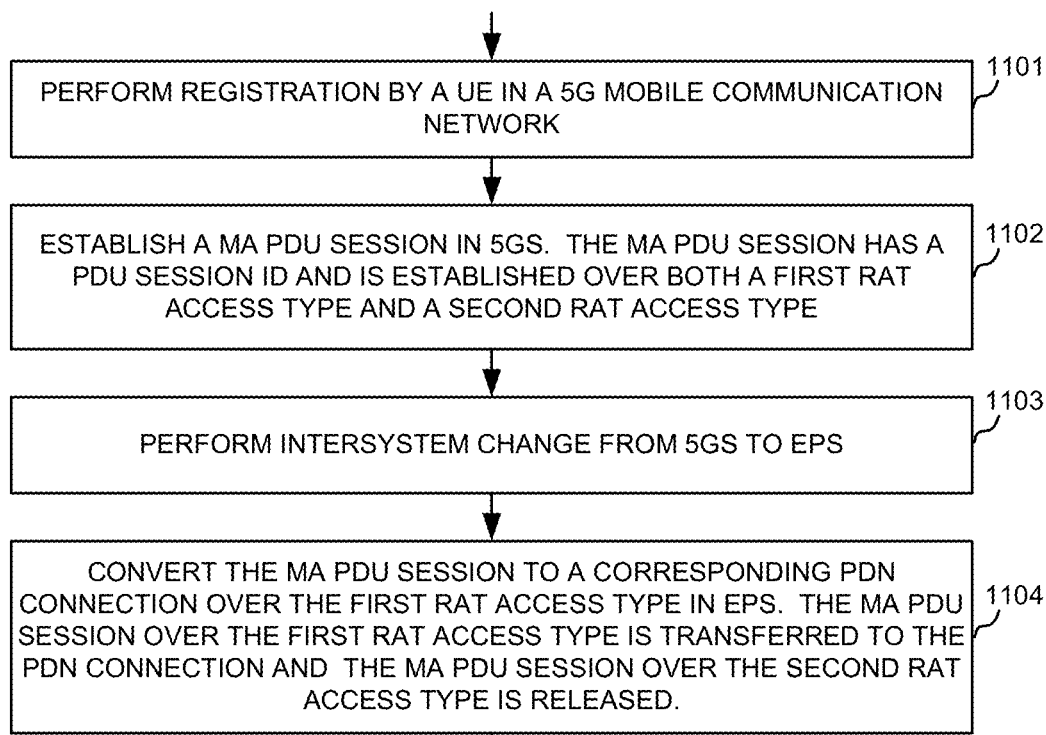
FIG. 11 is a flow chart of one method of supporting MA PDU session with intersystem change in accordance with one novel aspect of the present invention.

FIG. 11 is a flow chart of a method of supporting MA PDU session with intersystem change in accordance with one novel aspect of the present invention. In step 1101, a UE performs registration in a 5G mobile communication network. In step 1102, the UE establishes a multi-access (MA) Protocol data unit (PDU) session in 5G system (5GS). The MA PDU session has a PDU session ID (PSI) and is established over both a first radio access technology (RAT) access type and a second RAT access type. In step 1103, the UE performs an inter-system change from 5GS to evolved packet system (EPS). In step 1104, the UE converts the MA PDU session to a corresponding Packet Data Network (PDN) connection over the first RAT access type in EPS. The MA PDU session over the first RAT access type is transferred to the PDN connection and the MA PDU session over the second RAT access type is released.

Figure 12:
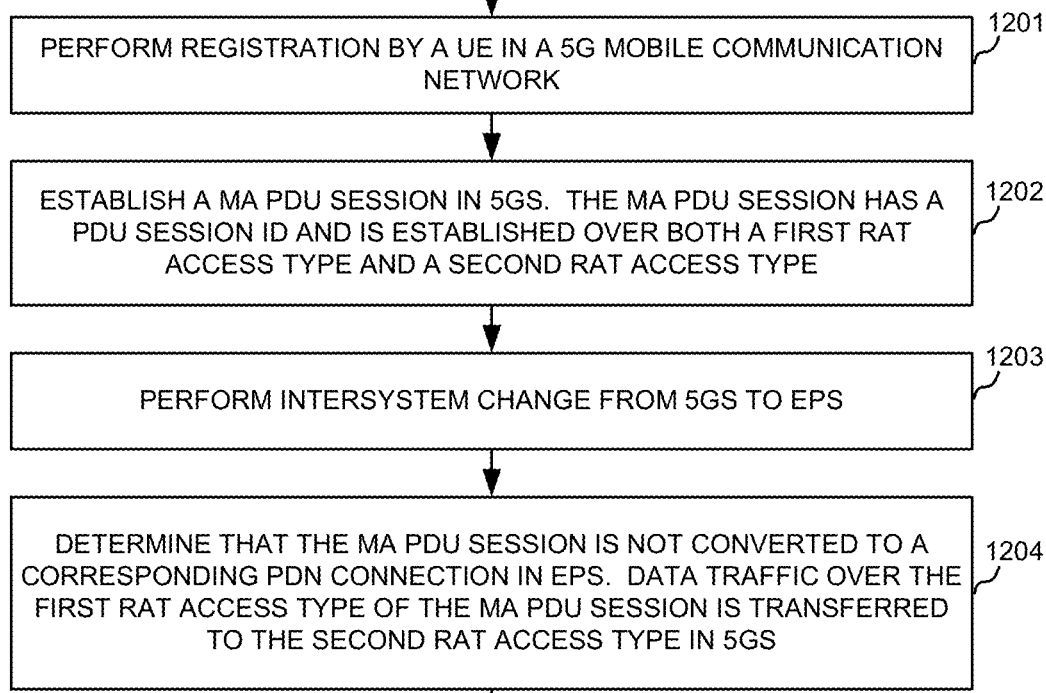
FIG. 12 is a flow chart of another method of supporting MA PDU session with intersystem change in accordance with one novel aspect of the present invention.

FIG. 12 is a flow chart of a method of supporting MA PDU session with intersystem change in accordance with one novel aspect of the present invention. In step 1201, a UE performs registration in a 5G mobile communication network. In step 1202, the UE establishes a multi-access (MA) Protocol data unit (PDU) session in 5G system (5GS). The MA PDU session has a PDU session ID (PSI) and is established over both a first radio access technology (RAT) access type and a second RAT access type. In step 1203, the UE performs an inter-system change from 5GS to evolved packet system (EPS). In step 1204, the UE determines that the MA PDU session is not converted to a corresponding protocol data network (PDN) connection in EPS. Data traffic over the first RAT access type of the MA PDU session is then transferred to the second RAT access type in 5GS.

MA PDU Session Handover Between PLMNs/AMFs

When a core network with Access Traffic Steering/Switching/Splitting (ATSSS) feature enable supports Multi-Access (MA) PDU Session establishment, the core network will inform the UE with an indicator that supports the establishment of a MA PDU Session within the Registration procedure. If the UE receives the indicator of supporting the establishment of a MA PDU Session in currently registered PLMN, i.e., ATSSS-supported indicator, the UE can initiate the procedure to establish a MA PDU Session if this UE supports the ATSSS feature. Otherwise, the UE may receive ATSSS-not-supported indicator or may receive no ATSSS related indicator when the UE registers to this PLMN. This indicator can prevent the UE from triggering the establishment of MA PDU Session and can avoid frequent signaling between the UE and the core network which does not support ATSSS feature. An ATSSS-supported UE first establishes a MA PDU Session on both 3GPP and non-3GPP access in a currently registered PLMN which is an ATSSS-supported network. The UE then moves from the ATSSS-supported network to an ATSSS-not-supported network and finally reaches another ATSSS-supported network. In one novel aspect, a solution is provided on how to handle the ongoing MA PDU Session with two accesses under the scenarios between ATSSS-supported and ATSSS-not-supported networks. Furthermore, if the ongoing MA PDU Session cannot handover to target network, a solution is provided on how to handle the MA PDU Session.

Figure 13:
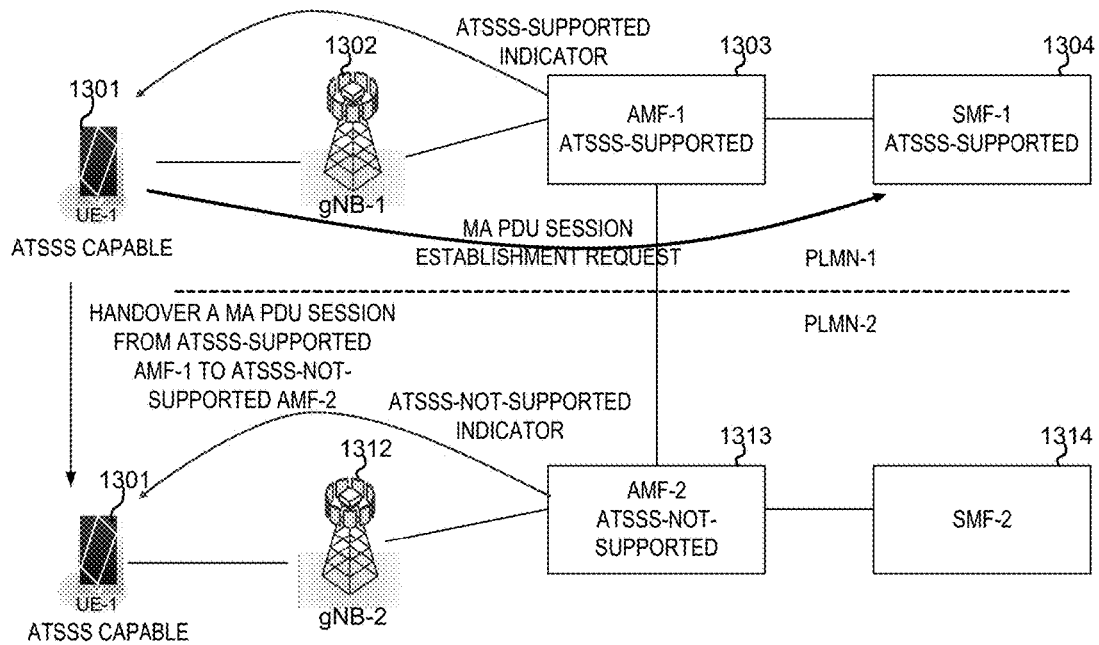
FIG. 13 illustrates one embodiment of handling MA PDU session handover when a UE moves from an ATSSS-supported PLMN/AMF to an ATSSS-not-supported PLMN/AMF in accordance with one novel aspect.

FIG. 13 illustrates one embodiment of handling MA PDU session handover when a UE moves from an ATSSS-supported PLMN/AMF to an ATSSS-not-supported PLMN/AMF in accordance with one novel aspect. In the embodiment of FIG. 13, UE 1301 (UE-1) is ATSSS capable, and is served by a first base station gNB 1302 (gNB-1) in a first PLMN-1, comprising a first AMF 1303 (AMF-1) and a first SMF 1304 (SMF-1). Since AMF-1 is ATSSS-supported, it sends an ATSSS support indicator to UE-1 during the registration procedure for the support of MA PDU session. As a result, UE-1 sends an MA PDU session establishment request to SMF-1 and establishes an MA PDU session over both 3GPP and non-3GPP access. On the other hand, PLMN-2 comprises a second base station gNB 1312 (gNB-2), a second AMF 1313 (AMF-2) and a second SMF 1314 (SMF-2). AMF-2 is ATSSS-not-supported and does not support MA PDU session.

When UE-1 moves from ATSSS-supported PLMN-1 to ATSSS-not-supported PLMN-2, the target network (PLMN-2) can inform UE-1 whether the 3GPP access of the MA PDU session can handover from gNB-1 to gNB-2 by using an ATSSS support indicator during registration procedure. Since the network can inform UE-1 with the indicator, e.g., an ATSSS-supported indicator or an ATSSS-not-supported indicator or no indicator during the registration related procedure to inform UE-1 whether the target network PLMN-2 supports ATSSS feature or not. If the target network PLMN-2 is ATSSS-not-supported, then UE-1 knows PLMN-2/AMF-2 is ATSSS-not-supported. There are two use cases under such scenario.

Under a first use case, the 3GPP access of the MA PDU session is transferred from PLMN-1 to PLMN-2, e.g., handover from gNB-1 to gNB-2. There are two alternatives under the first use case. Under the first alternative, the MA PDU Session cannot be completely transferred to the target network (i.e. PLMN-2), i.e. the 3GPP and non-3GPP access of the MA PDU Session cannot be used simultaneously in PLMN-2. Only 3GPP access part of the MA PDU Session can be transferred to the target network. The non-3GPP access part of the MA PDU Session is locally released by the SMF-1 in PLMN-1. During handover, the SMF-2 in the target network (i.e. PLMN-2) will establish the user plane (UP) resource for the 3GPP access part of the transferred MA PDU Session. Under the second alternative, the 3GPP access part is transferred to PLMN-2 while the UE can still access the non-3GPP UP resource over PLMN-1, then the UE can still use this PDU session as an MA PDU session (where the stored ATSSS rules are reused).

Under a second use case, the 3GPP access part of the MA PDU Session is not transferred to the target network. The AMF of the source network (AMF-1) informs the SMF of the source network (SMF-1), and the 3GPP access part of the MA PDU Session is released by SMF-1 and is marked as unavailable to the UE-1. There are two alternatives under the second use case. Under the first alternative, SMF-1 may move the traffic to the non-3GPP access of the MA PDU Session if the non-3GPP access part of the MA PDU Session is still available after handover. Under the second alternative, the MA PDU Session is entirely released by the SMF-1. Note that in the example of FIG. 13, AMF-1 and AMF-2 belong to two different PLMNs, PLMN-1 and PLMN-2 respectively. In another example, similar MA PDU handover handling mechanism is applicable when AMF-1 and AMF-2 belong to the same PLMN, as long as the UE moves from the source AMF-1 that is ATSSS-supported to the target AMF-2 that is ATSSS-not-supported.

Figure 14:
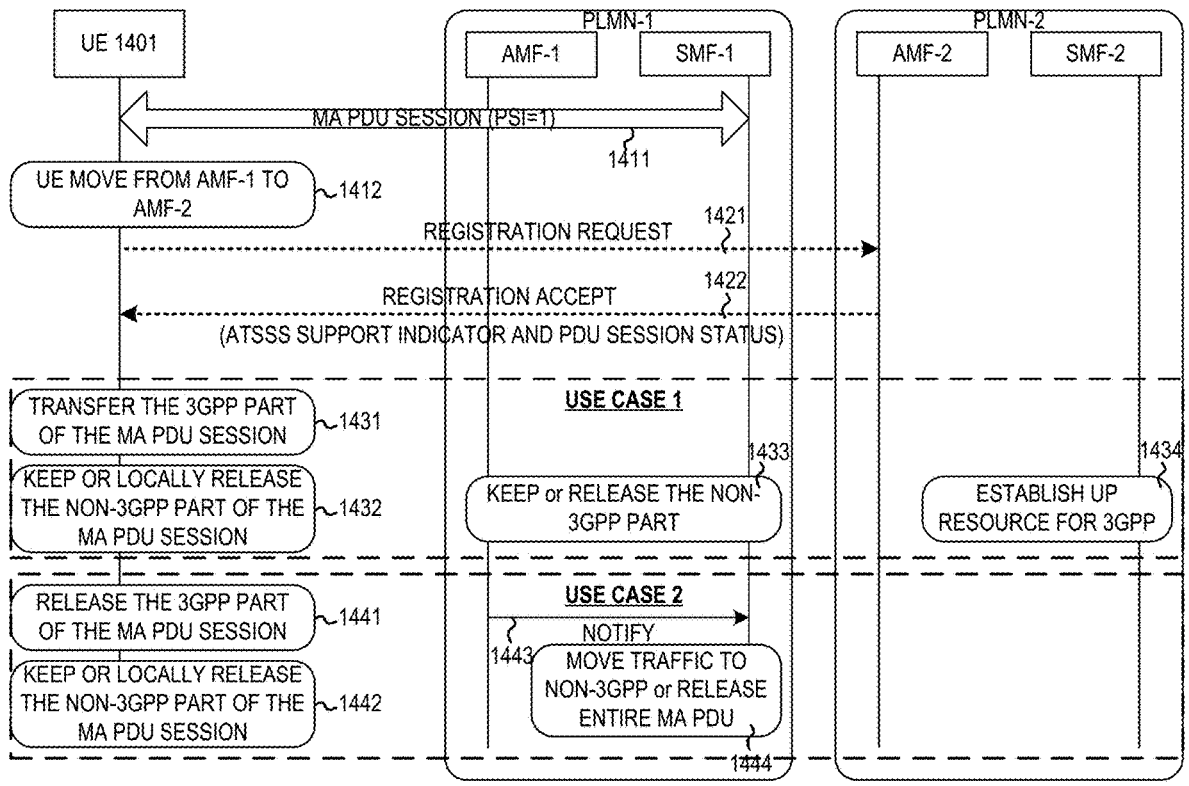
FIG. 14 illustrates a sequence flow between a UE, a source network (ATSSS-supported), and a target network (ATSSS-not-supported) for handover handling of an MA PDU session in accordance with one novel aspect.

FIG. 14 illustrates a sequence flow between a UE, a source network (ATSSS-supported), and a target network (ATSSS-not-supported) for handover handling of an MA PDU session in accordance with one novel aspect. In step 1411, UE 1401 establishes an MA PDU session in PLMN-1 over both 3GPP access and non-3GPP access. PLMN-1 contains AMF-1 (ATSSS-supported) and SMF-1. In step 1412, UE 1401 moves from source PLMN-1/AMF-1 to target PLMN-2/AMF-2, which contains AMF-2 (ATSSS-not-supported) and SMF-2. UE 1401 triggers Registration request to PLMN-2/AMF-2 (1421), and AMF-2 responds with an ATSSS support indicator and PDU Session status within the Registration accept message (1422). UE 1401 determines whether the established MA PDU session will be handover to the target PLMN-2 over 3GPP access, and thus determines whether to maintain the MA PDU session, based on the ATSSS support indicator provided by the network. Under Use Case 1, the 3GPP access part of the MA PDU session is transferred to target PLMN-2. Under Use Case 2, the 3GPP access part of the MA PDU session is not transferred to target PLMN-2.

Under Use Case 1, the MA PDU session cannot be completely transferred to the target network PLMN-2, i.e., the 3GPP access part and non-3GPP access part of the MA PDU session cannot be used simultaneously in PLMN-2, because AMF-2 in PLMN-2 is ATSSS-not-supported. However, the 3GPP access part of the MA PDU session is handover to the target network in step 1431. The non-3GPP access part of the MA PDU session may be locally released by the SMF-1 in PLMN-1 (step 1433). During the handover, the SMF-2 in PLMN-2 will establish the user plane resource for the 3GPP access part of the transferred MA PDU session (step 1434). From the UE perspective, since UE 1401 already received the ATSSS-not-supported indicator or receive no indicator from the currently network, e.g., AMF-2 in PLMN-2 during the registration, UE 1401 thus may locally release the non-3GPP part of the MA PDU session (step 1432) based on the ATSSS support indicator. Alternatively, the 3GPP access part is transferred to the new PLMN-2, while UE 1401 can still access the non-3GPP user plane resource over the original PLMN-1 and reuse the stored ATSSS rule. In other words, data traffic can be communicated over the non-3GPP access part of the MA PDU session in original PLMN-1, and also communicated over the transferred 3GPP access part of the MA PDU session in new PLMN-2.

Under Use Case 2, the 3GPP access part of the MA PDU session cannot be transferred to the target PLMN-2. UE 1401 thus may locally release the 3GPP access part of the MA PDU session (step 1441) after UE 1401 receives the ATSSS support indicator or PDU Session status. UE 1401 may either keep or release the non-3GPP access part of the MA PDU session (step 1442). Furthermore, UE 1401 may entirely locally release MA PDU Session when UE 1401 receives the ATSSS support indicator or PDU Session status. In the source PLMN-1, AMF-1 can notify SMF-1 that the MA PDU session is not handover to the target PLMN-2 (step 1443). As a result, the SMF-1 either release the entire MA PDU, or move data traffic on the 3GPP access part of the MA PDU session to the non-3GPP access of the MA PDU session (step 1444). Note that UE 1410 locally releases the MA PDU session when UE 1401 receives the ATSSS support indicator and PDU session status, without additional signaling exchange with the network, and network also locally releases the MA PDU session, to reduce signaling overhead. Also note that UE 1401 can locally release 3GPP and non-3GPP access of the MA PDU session as described in steps 1441 and 1442. Alternatively, UE 1401 can locally release the entire MA PDU session at one time.

Figure 15:
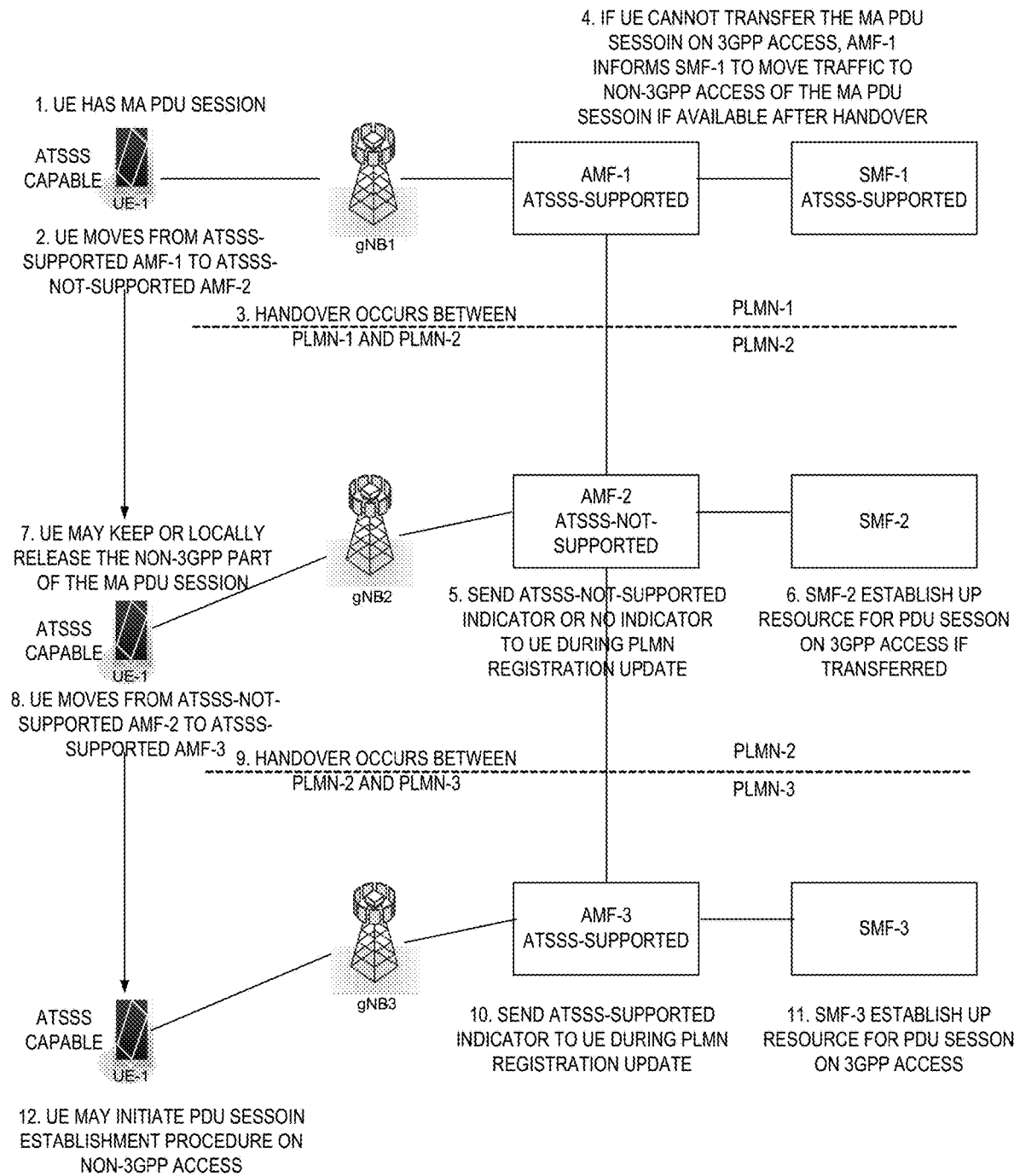
FIG. 15 illustrates one embodiment of handling MA PDU session handover when a UE moves from an ATSSS-supported PLMN/AMF to an ATSSS-not-supported PLMN/AMF, and then moves to another ATSSS-supported PLMN/AMF in accordance with one novel aspect.

FIG. 15 illustrates one embodiment of handling MA PDU session handover when a UE moves from an ATSSS-supported PLMN/AMF to an ATSSS-not-supported PLMN/AMF, and then moves to another ATSSS-supported PLMN/

AMF in accordance with one novel aspect. In the example of FIG. 15, the UE is ATSSS capable, AMF-1 in PLMN-1 is ATSSS-supported, AMF-2 in PLMN-2 is ATSSS-not-supported, and AMF-3 in PLMN-3 is ATSSS-supported. In step 1, UE is served by gNB-1 and establishes an MA PDU session in PLMN-1. In step 2, UE moves from ATSSS-supported AMF-1 in PLMN-1 to ATSSS-not-supported AMF-2 in PLMN-2. In step 3, handover occurs between PLMN-1 and PLMN-2 and UE is served by gNB-2. The 3GPP access part of the MA PDU session may be transferred to PLMN-2. In step 4, if UE cannot transfer the MA PDU session on 3GPP access, then AMF-1 informs SMF-1 to move traffic to non-3GPP access of the MA PDU session if it is still available after handover. In step 5, AMF-2 sends ATSSS-not-supported indicator or no indicator to UE during PLMN registration update. In step 6, SMF-2 establishes the user plane (UP) resource for the PDU session on 3GPP access if it is transferred. In step 7, UE either keeps or locally releases the non-3GPP access part of the MA PDU session.

In step 8, UE is moving from an ATSSS-not-supported network to another ATSSS-supported network, e.g. UE is moving from ATSSS-not-supported PLMN-2 to ATSSS-supported PLMN-3. In step 9, handover occurs between PLMN-2 and PLMN-3. Similarly, in step 10, PLMN-3/AMF-3 will inform the UE with the ATSSS-supported indicator during PLMN registration update, and UE will receive the ATSSS-supported indicator. In step 11, SMF-3 may initiate the PDU Session modification procedure to establish the UP resource on the 3GPP access of the MA PDU Session and allocate the ATSSS rules to the UE. In step 12, after UE registers to the non-3GPP access in PLMN-3, the UE may initiate the PDU Session Establishment procedure to establish the UP resources on the non-3GPP access of the MA PDU Session.

Figure 16:
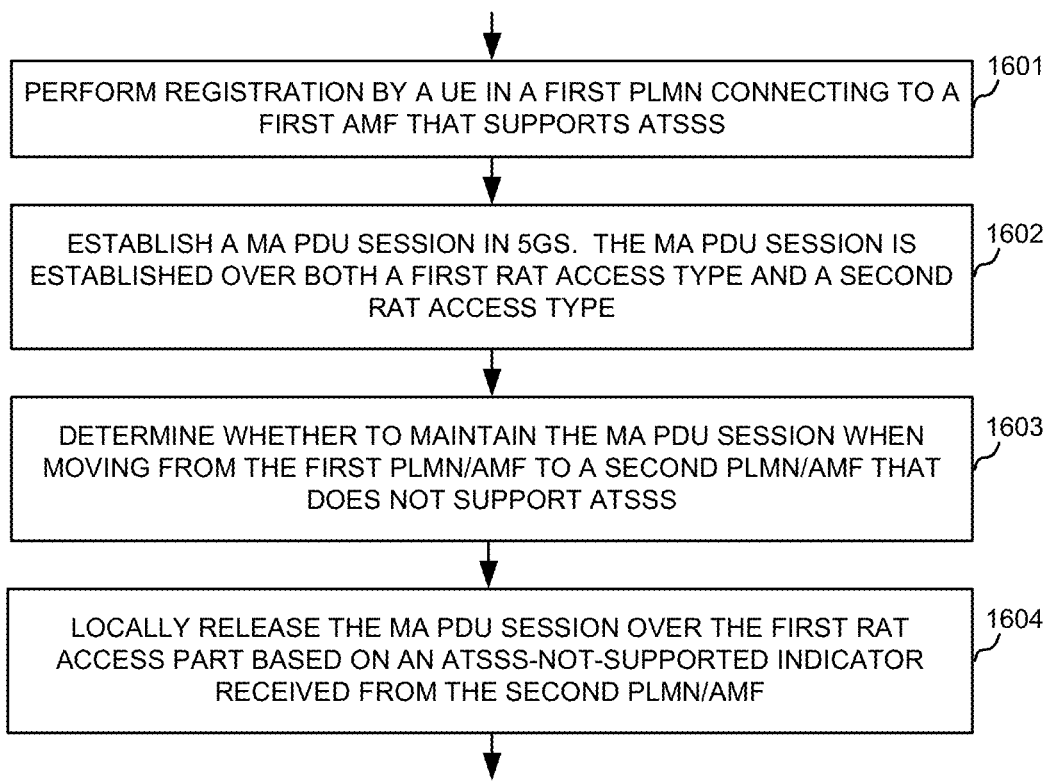
FIG. 16 is a flow chart of a method of a UE handling MA PDU session between ATSSS-supported PLMN/AMF and ATSSS-not-supported PLMN/AMF in accordance with one novel aspect.

FIG. 16 is a flow chart of a method of a UE handling MA PDU session between ATSSS-supported PLMN/AMF and ATSSS-not-supported PLMN/AMF in accordance with one novel aspect. In step 1601, the UE performs registration in a first public land mobile network (PLMN) connecting to a first access management function (AMF) that supports Access Traffic Steering Switching and Splitting (ATSSS). In step 1602, the UE establishes a multi-access (MA) Protocol data unit (PDU) session in the first PLMN. The MA PDU session is established over both a first radio access technology (RAT) access type and a second RAT access type. In step 1603, the UE determines whether to maintain the MA PDU session when moving from the first PLMN/AMF to a second PLMN/AMF that does not support ATSSS. In step 1604, the UE locally releases the MA PDU session over the first RAT access part based on an ATSSS-not-supported indicator received from the second PLMN/AMF.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
performing registration by a user equipment (UE) in a first public land mobile network (PLMN) connecting to a first access management function (AMF) that supports Access Traffic Steering Switching and Splitting (ATSSS);
establishing a multi-access (MA) Protocol data unit (PDU) session in the first PLMN, wherein the MA PDU session is established over both a first radio access technology (RAT) access type and a second RAT access type;
determining whether to maintain the MA PDU session when moving from the first PLMN/AMF to a second PLMN/AMF that does not support ATSSS; and
locally releasing the MA PDU session over the first RAT access part based on an ATSSS-not-supported indicator received from the second PLMN/AMF, wherein the UE releases user plane resources of the MA PDU session over the second RAT access part in the first PLMN.

2. The method of claim 1, wherein the first RAT access type is 3GPP access, and wherein the second RAT access type is non-3GPP access.

3. The method of claim 1, wherein the MA PDU session is handover to the second PLMN, wherein the MA PDU session over the first RAT access part is transferred to the PDU session in the second PLMN.

4. The method of claim 3, wherein the UE releases user plane resources of the MA PDU session over the second RAT access part in the first PLMN.

5. The method of claim 3, wherein the UE keeps user plane resources of the MA PDU session over the second RAT access part in the first PLMN, and wherein the UE reuses stored ATSSS rules.

6. The method of claim 1, further comprising:
handing over to a third PLMN having a third AMF that supports ATSSS; and
performing a PDU session modification procedure to upgrade the PDU session to a new MA PDU session upon handover.

7. The method of claim 6, further comprising:
initiating a PDU session establishment procedure to establish user plane resources on the non-3GPP access of the new MA PDU Session.

8. The method of claim 1, further comprising:
transmitting a registration request message to the second PLMN/AMF; and
receiving a registration accept message from the second PLMN/AMF, wherein the registration accept message comprises the ATSSS-not-supported indicator or no indicator and a PDU session status.

9. A User Equipment (UE) comprising:
a registration circuit that performs registration in a first public land mobile network (PLMN) connecting to a first access management function (AMF) that supports Access Traffic Steering Switching and Splitting (ATSSS);
a session management circuit that establishes a multi-access (MA) Protocol data unit (PDU) session in the first PLMN, wherein the MA PDU session is established over both a first radio access technology (RAT) access type and a second RAT access type; and
a controller that determines whether to maintain the MA PDU session when moving from the first PLMN/AMF to a second PLMN/AMF that does not support ATSSS, wherein the UE locally releases the MA PDU session over the first RAT access part based on an ATSSS-not-supported indicator received from the second PLMN/AMF, wherein the UE releases user plane resources of the MA PDU session over the second RAT access part in the first PLMN.

10. The UE of claim 9, wherein the first RAT access type is 3GPP access, and wherein the second RAT access type is non-3GPP access.

11. The UE of claim 9, wherein the MA PDU session is handover to the second PLMN, wherein the MA PDU session over the first RAT access part is transferred to the PDU session in the second PLMN.

12. The UE of claim 11, wherein the UE releases user plane resources of the MA PDU session over the second RAT access part in the first PLMN.

13. The UE of claim 11, wherein the UE keeps user plane resources of the MA PDU session over the second RAT access part in the first PLMN, and wherein the UE reuses stored ATSSS rules.

14. The UE of claim 9, further comprising:
a handover circuit that hands over the UE to a third PLMN having a third PLMN/AMF that supports ATSSS, wherein the UE performs a PDU session modification procedure to upgrade the PDU session to a new MA PDU session upon handover.

15. The UE of claim 14, wherein the UE initiates a PDU session establishment procedure to establish user plane resources on the non-3GPP access of the new MA PDU Session.

16. The UE of claim 9, further comprising:
a transmitter that transmits a registration request message to the second PLMN/AMF; and
a receiver that receives a registration accept message from the second PLMN/AMF, wherein the registration accept message comprises the ATSSS-not-supported indicator or no indicator and a PDU session status.

* * * * *